United States Patent Office 3,184,508
Patented May 18, 1965

3,184,508
CRYSTALLIZATION OF BIURET FROM BIURET-CONTAINING AQUEOUS SOLUTIONS SATURATED WITH UREA
Petrus J. C. Kaasenbrood, Sittard, Netherlands, assignor to Stamicarbon N.V., Heerlen, Netherlands
No Drawing. Filed Oct. 18, 1962, Ser. No. 231,592
3 Claims. (Cl. 260—555)

The present invention relates to the purification of urea by removal of biuret.

Urea often is contaminated with small quantities of biuret. It has already been proposed that the biuret be recovered from biuret-containing solutions saturated with urea by making use of the difference in solubility between biuret and urea at decreasing temperatures. This is accomplished first by diluting the solution and then cooling it, as a result of which [5 biuret.4($H_2O$)] crystallizes out while the urea remains in solution. The biuret crystals can then be separated from the remaining solution in a customary way, for instance, by filtration or centrifugation.

The solubility of biuret decreases considerably between 25° C. and 0° C., so that this technique can be practiced by using a crystallization temperature well below 25° C., e.g., about 12° C., because in that case the amount of diluting water to be added, which has to be evaporated again afterwards, will be lower per kg. of crystallized biuret. However, the drawback of this low crystallization temperature is that the heat of crystallization set free must be carried away at a low temperature level. This requires the use of cooling with the aid of cooling machines which are relatively expensive to run, since cooling water from conventional cooling towers is too warm.

According to the invention, the use of these cooling machines can now be avoided by first purposely effecting a crystallization of a mixture of urea and biuret-crystals at a rather higher temperature, e.g., 20–35° C. such that the biuret crystallizes in the form of a double salt with urea, the approximate composition being [2 urea, 1 biuret] to form a suspension in mother liquor. Then the crystal suspension is diluted with water of normal ambient temperature, e.g., 20–25° C. with the result that the crystallized urea dissolves, the double salt decomposes, and biuret crystals are left in suspension. The process of dissolving the urea crystals and the urea contained in the double salt is endothermic (heat is required), so that heat is automatically withdrawn from the solution, in consequence of which the said solution strongly decreases in temperature. From the suspension of biuret crystals which is thus obtained at a lower energy cost than in the known process, the biuret crystals can be separated in a customary way, e.g., by filtration.

The invention is of particular importance for evaporating and crystallizing the urea solutions coming from the urea synthesis. When solutions of this type are continuously crystallized in a vacuum crystallizer, biuret accumulates as water is evaporated and urea crystallizes so that the content in the crystallizer will gradually increase owing to the continuous supply of the urea solution, which is invariably contaminated with biuret. To prevent simultaneous crystallization of biuret and urea, the present invention provides for removal of some biuret periodically or continuously from the mother liquor that has been freed of urea crystals, before this mother liquor is returned to the vacuum crystallizer.

The invention is illustrated by the following example of a cyclic process for the evaporation and crystallization of a biuret-containing urea solution, in which process urea crystals are recovered in a vacuum crystallizer and separated from the solution, the remaining mother liquor is subjected to the biuret crystallization according to the invention, and finally the mother liquor is returned to the urea crystallizer.

Example

From a vacuum crystallizer operating at 60° C. and 70 mm. Hg a 24%-by-weight suspension of urea crystals having the following composition was removed in each cycle:

100 kg. of urea crystals
315.5 kg. of solution, containing
    209 kg. of urea
    31.5 kg. of biuret
    75 kg. of water The suspension was centrifuged at 60° C. with recovery of the urea crystals. 13 kg. of the mother liquor were removed, the bulk (302.5 kg.) being fed back to the urea crystallizer together with the freshly supplied urea solution (127 kg., consisting of 100 kg. of urea, 0.76 kg. of biuret, and 26 kg. of water) used as washing liquid for the centrifuged urea crystals.

The 13 kg. of removed mother liquor (8.6 kg. of urea, 1.3 kg. of biuret, and 3.1 kg. of water), were diluted with a small amount (1.1 kg.) of water and cooled to 25° C. as a result of which urea and the double salt of urea and biuret crystallized out. 6.2 kg. of water having a temperature of 23° C. were added to the resulting crystal suspension. Owing to the dissolution of the urea crystals and the decomposition of the double salt, of which some biuret went into solution in addition to the urea, the temperature dropped to 12° C. There remained 0.85 kg. of biuret crystals (5 biuret.4$H_2O$), which were centrifuged off. The remaining mother liquor was also returned to the urea crystallization; here 34 kg. of water per cycle were removed by evaporation. The moist centrifuged urea crystals (100 kg. of urea and 6.7 kg. of adhering washing liquid) separated in each cycle as above were dried pneumatically, yielding an end product with a biuret content of only 0.04%.

If the process according to the invention should not have been applied, it would have been necessary either to employ a cooling machine for cooling the biuret-containing mother liquor to 12° C., or to remove more mother liquor and then effect the biuret crystallization at about 25° C. In the latter case, more diluting water would have to be added for effecting the biuret crystallization. This diluting water will finally have to be removed by evaporation during the urea vacuum crystallization.

The saving on evaporation expenses realized when using the process according to the invention amounts to about 7.5%; the cost of raising the temperature of the cooled mother liquor to that of the urea crystallizer has decreased by approximately 28%—as compared with that in the known process—because it suffices to feed back a considerably smaller amount of mother liquor that has been subjected to the biuret crystallization.

What is claimed is:

1. A process for making a purified aqueous solution of urea from an aqueous solution saturated with urea and containing biuret by removing the biuret which comprises first diluting and cooling said urea-saturated solution to such a degree that a suspension of urea crystals and crystals of a double salt of urea and biuret is formed, the total amount of water in the diluted aqueous solution being insufficient to dissolve all of said urea at the temperatures to which the solution is cooled, adding water to the crystal suspension to further dilute it with a sufficient amount of water that all the crystallized urea redissolves endothermically, with simultaneous withdrawal of heat from the solution, and then separating the biuret crystals which remain from the solution.

2. A process for making a purified aqueous solution of urea according to claim 1 in which the solution saturated with urea has been obtained by continuous evaporation and crystallization of a biuret-containing urea solution fed to a vacuum crystallizer with simultaneous discharge of a suspension containing urea crystals and separation of the urea crystals, said biuret being removed prior to feedback of the mother liquor to the vacuum crystallizer.

3. A process for making a purified aqueous solution of urea as set forth in claim 1 in which the temperature to which the urea-saturated solution is cooled to effect crystallization is 20 to 35° C.

References Cited by the Examiner
FOREIGN PATENTS
1,127,788   12/56   France.

OTHER REFERENCES

De Malde: La Chimica e l'Industria, vol. 38, No. 7 (1957), pp. 571–5.

NICHOLAS S. RIZZO, *Primary Examiner*.